US012407200B2

(12) United States Patent
Ciubotaru et al.

(10) Patent No.: US 12,407,200 B2
(45) Date of Patent: Sep. 2, 2025

(54) STATOR CORE, ASSEMBLY COMPRISING A STATOR CORE AND SLOT LININGS, STATOR, ELECTRIC MACHINE AND VEHICLE (71) Applicant: Valeo eAutomotive Germany GmbH, Erlangen (DE)

(72) Inventors: Cristian Ciubotaru, Bad Neustadt a.d.Saale (DE); Boris Dotz, Bad Neustadt a.d.Saale (DE); Christian Finger-Albert, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 266 days.

(21) Appl. No.: 18/257,155

(22) PCT Filed: Dec. 8, 2021

(86) PCT No.: PCT/EP2021/084858
§ 371 (c)(1),
(2) Date: Jun. 13, 2023

(87) PCT Pub. No.: WO2022/128697
PCT Pub. Date: Jun. 23, 2022

(65) Prior Publication Data
US 2024/0030758 A1 Jan. 25, 2024

(30) Foreign Application Priority Data
Dec. 15, 2020 (DE) ..................... 10 2020 215 913.0

(51) Int. Cl.
H02K 1/16 (2006.01)
H02K 3/30 (2006.01)
H02K 3/34 (2006.01)

(52) U.S. Cl.
CPC ............... *H02K 1/165* (2013.01); *H02K 3/30* (2013.01); *H02K 3/345* (2013.01)

(58) Field of Classification Search
CPC ........... H02K 1/165; H02K 3/30; H02K 3/345
(Continued)

(56) References Cited

U.S. PATENT DOCUMENTS 9,444,298 B2  9/2016 Kaiser et al.
10,333,371 B2 * 6/2019 Takahashi ................ H02K 3/34
(Continued)

FOREIGN PATENT DOCUMENTS

WO  WO 2011/142264 A1  11/2011

OTHER PUBLICATIONS

International Search Report issued Apr. 4, 2022 in PCT/EP2021/084858 filed on Dec. 8, 2021, 2 pages.

*Primary Examiner* — Rashad H Johnson
(74) *Attorney, Agent, or Firm* — Oblon, McClelland, Maier & Neustadt, L.L.P.

(57) ABSTRACT

A stator core for receiving a stator winding and slot linings. A respective slot lining has a first end extending along an axial direction, a second end situated opposite the first end and extending along the axial direction, a first end section extending from the first end toward the second end, and a second end section extending from the second end toward the first end and is overlapped by the first end section on an outer side of the respective slot lining. A multiplicity of slots are arranged in the circumferential direction is formed in the stator core, a respective slot having a first slot wall which delimits the slot in the circumferential direction, a second slot wall which is situated opposite the first slot wall and delimits the slot in the circumferential direction, and a slot base which delimits the slot in the radial direction.

20 Claims, 7 Drawing Sheets (58) Field of Classification Search
USPC .................................................. 310/216.069
See application file for complete search history.

(56) References Cited

U.S. PATENT DOCUMENTS

| | | | | |
|---|---|---|---|---|
| 10,998,786 | B2* | 5/2021 | Kuroyanagi | H02K 3/487 |
| 2004/0189134 | A1* | 9/2004 | Onishi | H02K 3/345 |
| | | | | 310/215 |
| 2005/0280327 | A1* | 12/2005 | Neet | H02K 3/345 |
| | | | | 310/216.011 |
| 2007/0052317 | A1* | 3/2007 | Tanaka | H02K 3/487 |
| | | | | 310/214 |
| 2011/0109189 | A1* | 5/2011 | Taema | H02K 15/095 |
| | | | | 310/215 |
| 2012/0169173 | A1* | 7/2012 | Jang | H02K 3/345 |
| | | | | 310/215 |
| 2012/0235534 | A1* | 9/2012 | Chamberlin | H02K 3/345 |
| | | | | 310/215 |
| 2012/0256512 | A1* | 10/2012 | Fubuki | H02K 3/345 |
| | | | | 310/215 |
| 2013/0169085 | A1* | 7/2013 | Taema | H02K 3/28 |
| | | | | 310/71 |
| 2014/0319959 | A1* | 10/2014 | Kaiser | H02K 3/34 |
| | | | | 310/215 |
| 2015/0035404 | A1* | 2/2015 | Taema | H02K 3/345 |
| | | | | 310/208 |
| 2017/0133901 | A1* | 5/2017 | Burch | H02K 1/04 |
| 2017/0201133 | A1* | 7/2017 | Hattori | H02K 1/16 |
| 2018/0175693 | A1* | 6/2018 | Mitsui | H02K 3/345 |
| 2018/0233969 | A1* | 8/2018 | Chaillou | H02K 1/165 |
| 2019/0149023 | A1* | 5/2019 | Weber | H02K 3/345 |
| | | | | 310/216.069 |
| 2019/0312480 | A1* | 10/2019 | Yamazaki | H02K 3/48 |
| 2019/0334397 | A1* | 10/2019 | Kaji | H02K 3/34 |
| 2021/0057971 | A1* | 2/2021 | Takeda | H02K 3/12 |
| 2021/0083539 | A1* | 3/2021 | Maruyama | B21D 28/28 |
| 2021/0167657 | A1* | 6/2021 | Koga | H02K 3/50 |
| 2021/0184528 | A1* | 6/2021 | Koga | H02K 3/12 |
| 2021/0288543 | A1* | 9/2021 | Fukuda | H02K 15/105 |
| 2021/0367472 | A1* | 11/2021 | Kuroyanagi | H02K 15/064 |
| 2021/0376671 | A1* | 12/2021 | Tsuchiya | H02K 15/064 |
| 2021/0384787 | A1* | 12/2021 | Okamoto | H02K 3/345 |
| 2022/0103030 | A1* | 3/2022 | Tsukamoto | F25B 31/026 |
| 2022/0286005 | A1* | 9/2022 | Ueda | H02K 3/30 |
| 2022/0393538 | A1* | 12/2022 | Engelhardt | H02K 15/021 |
| 2023/0069321 | A1* | 3/2023 | Ito | H02K 1/165 |
| 2023/0163652 | A1* | 5/2023 | Rathnam | H02K 15/10 |
| | | | | 310/215 |
| 2023/0253849 | A1* | 8/2023 | Ponzio | H02K 15/105 |
| | | | | 315/215 |
| 2023/0307998 | A1* | 9/2023 | Onda | H02K 5/225 |
| 2024/0022130 | A1* | 1/2024 | Lettich | H02K 3/24 |
| 2024/0030758 | A1* | 1/2024 | Ciubotaru | H02K 3/30 |
| 2024/0128823 | A1* | 4/2024 | Li | H02K 15/10 |
| 2024/0275228 | A1* | 8/2024 | Humphrey | H02K 3/487 |
| 2024/0305153 | A1* | 9/2024 | Ohzu | H02K 3/345 |
| 2024/0396394 | A1* | 11/2024 | Morimoto | H02K 3/345 |
| 2024/0413693 | A1* | 12/2024 | Pradeepkumar | H02K 3/345 |
| 2025/0038602 | A1* | 1/2025 | Miyata | H02K 1/165 |
| 2025/0038608 | A1* | 1/2025 | Miyata | H02K 3/345 |

* cited by examiner

STATOR CORE, ASSEMBLY COMPRISING A STATOR CORE AND SLOT LININGS, STATOR, ELECTRIC MACHINE AND VEHICLE

The present invention relates to a stator core for receiving a stator winding and slot linings, wherein a respective slot lining has a first end, which extends along an axial direction, a second end, which is situated opposite the first end and extends along the axial direction, a first end section, which extends from the first end in the direction of the second end, and a second end section, which extends from the second end in the direction of the first end and is overlapped by the first end section on an outer side of the respective slot lining, wherein a multiplicity of slots arranged in the circumferential direction is formed in the stator core, wherein a respective slot has a first slot wall, which delimits the slot in the circumferential direction, a second slot wall, which is situated opposite the first slot wall and delimits the slot in the circumferential direction, and a slot base, which delimits the slot in the radial direction and forms a first receiving space, which is configured to receive the first end section, and a second receiving space, which directly adjoins the first receiving space, is delimited by the second slot wall and the slot base and is configured to receive the stator winding and the sections of the slot lining which are outside the first end section.

In addition, the invention relates to an assembly comprising a stator core and slot linings, to a stator, to an electric machine and to a vehicle.

In the case of stators comprising a stator core and a stator winding, sufficient air and leakage paths must be maintained between these two components, these distances being dependent, in particular, on the voltage applied to the stator windings. For this purpose, there is a known practice of arranging a slot lining in a respective slot of the stator core, the said lining surrounding the stator winding received in the slot. Such a slot lining is formed, for example, from an insulation paper or some other electrically insulating, flat body which is folded or bent in accordance with the dimensions of the slot. In this case, a first end section and a second end section of the slot lining overlap. In accordance with the required air and leakage paths, the length of the first end section, considered in cross section, which overlaps the second end section has to be sufficiently long.

US 2012/0 293 037 A1 discloses a rotating electric machine having a rotor and an annular stator arranged around the rotor. The stator comprises slots which extend in the radial direction of the stator, a stator core, in which the slots are formed at a distance from one another in the circumferential direction, insulation paper, which is received in the slots, and coils, which are arranged in the slots in such a way that they are isolated from the stator core by the insulation paper. The insulation paper has curved sections which overlap one another in an overlap section. A radially inner side of the insulation paper is thereby closed.

In such a configuration, in which a first receiving space for a first end section, which overlaps a second end section of the slot lining on the outer side thereof, is provided radially on the inside, the formation of air and leakage paths is limited substantially to the distance between two slot walls of a respective slot. If high voltages are to be applied to the stator winding, the air and leakage paths in this region may be too small.

The object on which the invention is based is that of specifying a possibility for operating an electric machine for driving an electric vehicle which ensures sufficient air and leakage paths in its slots, even at high voltages.

To achieve this object, provision is made according to the invention, in the case of the stator core of the type mentioned at the outset, for the first receiving space to adjoin the second receiving space in the circumferential direction and to be delimited by the first slot wall.

A stator core for receiving a stator winding and slot linings is proposed. A respective slot lining has a first end, which extends along an axial direction. A respective slot lining furthermore has a second end, which is situated opposite the first end and extends along the axial direction. A respective slot lining furthermore has a first end section, which extends from the first end in the direction of the second end. A respective slot lining further comprises a second end section, which extends from the second end in the direction of the first end. The second end section is overlapped by the first end section on an outer side of the respective slot lining. A multiplicity of slots arranged in the circumferential direction is formed in the stator core. A respective slot has a first slot wall, which delimits the slot in the circumferential direction. A respective slot furthermore has a second slot wall, which is situated opposite the first slot wall and delimits the slot in the circumferential direction. A respective slot furthermore has a slot base, which delimits the slot in the radial direction. A respective slot forms a first receiving space. The receiving space is configured to receive the first end section. A respective slot furthermore forms a second receiving space. The second receiving space directly adjoins the first receiving space. The second receiving space is delimited by the second wall and the slot base. The second receiving space is configured to receive the stator windings and sections of the slot lining which are outside the first end section. The first receiving space adjoins the second receiving space in the circumferential direction. The first receiving space is delimited by the first slot wall.

The invention is based on the consideration of providing the second receiving space for the overlapping first end section on the same side as the first slot wall, thus enabling the entire radial extent thereof to be used for receiving the first end section. Particularly if the radial extent of the slot is greater than its extent in the circumferential direction, a considerably greater space is available for the reception of the first end section than if the first end section is situated between the slot walls on the side of the slot which faces away from the slot base. The invention advantageously makes it possible to obtain longer air and leakage paths along the end sections of the slot lining and thus to provide a higher voltage applied to the stator windings during operation of an electric machine comprising the stator core.

The stator core is preferably formed from a multiplicity of axially layered individual laminations and/or individual laminations which are electrically insulated from one another. In this respect, the stator core can also be referred to as or considered to be a laminated stator core. A respective slot preferably extends from an axial first end of the stator core to an axial second end face of the stator core opposite the first end. On its inner lateral surface, the stator core preferably surrounds a receiving space for a rotor. A respective slot is preferably connected to the receiving space by a slot opening on its side situated radially opposite the slot base. Teeth of the stator core are preferably formed between a respective pair of directly adjacent slots of the stator core, said teeth forming the slot walls. The slot opening is preferably delimited in the radial direction by tooth heads of the teeth. The stator core can further comprise a yoke which surrounds the slots radially on the outside and forms the slot base. The first slot wall and/or the second slot wall can merge into the slot base with a rounded cross section. Beyond the region in which it receives the first end section, the first receiving space can furthermore be configured to form a free space between the second receiving space and the first slot wall.

In a preferred embodiment, it is envisaged that the first slot wall extends along a first straight line at least in some section or sections, the second slot wall extends along a second straight line, and the slot base extends along a third straight line, so that the first straight line and the second straight line form the legs of a trapezium, the base side of which lies on the third straight line, wherein the trapezium has a first interior angle, which is enclosed by the first straight line and the third straight line, and a second interior angle, which is enclosed by the second straight line and the third straight line.

The second receiving space can have a radially inner boundary. The radially inner boundary can extend along a fourth straight line, on which in particular a further base side of the trapezium lies. In this case, the slot lining can extend radially on the inside along the fourth straight line. A third interior angle of the trapezium, which is enclosed by the second straight line and the fourth straight line, is preferably a rectangle.

The first slot wall can extend in a straight line between a transition of the first slot wall into the slot base and a transition of the first slot wall into the radially inner boundary of the second receiving space. In this case, a fourth interior angle, which is enclosed by the first straight line and the fourth straight line, can be greater than 90°. In particular, the fourth interior angle is 180° minus the first interior angle.

Alternatively, the first slot wall can have a first section, which extends along the first straight line, and a second section, which extends along a further straight line, wherein, at a predetermined radial position, the first straight line and the further straight line enclose a further interior angle, which is less than 180 degrees, preferably less than 179 degrees, particularly preferably less than 178 degrees. The first slot wall can thus be formed, for example, with an obtuse-angled bend at the specified radial position. Provision can be made for the specified radial position to correspond to a radial position at which the first end of the slot lining is situated, or to be situated further inward than a radial position at which the first end of the slot lining is situated. A fourth interior angle, which is enclosed by the further straight line and the fourth straight line, can be greater than 90°. The fourth interior angle can be 360° minus the sum of the first and further interior angles.

It is preferred if the first interior angle is smaller than the second interior angle. In cross section, this results in an extension of the slot base to form the first receiving space. In this case, the first interior angle can be dependent on the length of the first end section. In particular, the greater the length of the overlap of the end sections, the smaller the first interior angle.

Alternatively, the first interior angle can be a rectangle. This is advantageous, in particular, in combination with the first slot wall having the first and the second section.

The second interior angle is preferably a rectangle. It is thereby possible to add the first receiving space to conventional stator cores with substantially rectangular slots with little effort.

As already mentioned above, it is preferred if the first end section is longer in cross section than the slot base and/or than a radially innermost distance between the slot walls. The space running substantially in the radial direction is thereby used efficiently to extend the air and leakage paths.

It is furthermore preferred if the first end section extends in cross section from the first end to the slot base.

Alternatively or in addition, the overlapping end sections are arranged radially closer to the slot base than to the radially innermost point of the slot walls and/or than to the radially innermost point of the slot lining. As a result, the first receiving space can extend into a region of the stator core in which it impairs the magnetic flux distribution along the teeth as little as possible.

The object on which the invention is based is further achieved by an assembly comprising a stator core according to the invention and the slot linings, wherein the first end section of the slot linings is received in the first receiving space of the slots and those sections of the slot linings which are outside the first end section are received in the second receiving space of the slots.

It is preferred if the first end section rests against the first slot wall and/or sections of the slot lining which are situated between the first end section and the second end section rest against the second slot wall and/or against the slot base. This enables the slot lining to line the slot as snugly as possible.

In general, a respective slot lining can be formed from an electrically insulating, flat body. It is particularly preferred that a respective slot lining is formed from an electrically insulating material, in particular from an insulation paper.

The object on which the invention is based is furthermore achieved by a stator comprising an assembly according to the invention and the stator winding, a section or sections of which extend within the second receiving space of a respective slot and which is surrounded by the slot lining received in the respective slot.

In a preferred embodiment, the stator winding is formed by shaped conductors, which are received in a radially layered manner in a respective slot. The shaped conductors preferably have a rectangular cross-sectional area, which may be rounded. The shaped conductors are preferably formed by rods. The shaped conductors can be formed by copper. The shaped conductors are preferably not pliable. The stator winding can also be considered to be or referred to as a hairpin winding. At least four, preferably at least six, particularly preferably at least eight, shaped conductors are preferably accommodated in each slot. Furthermore, at most 20, preferably at most 16, particularly preferably at most 12 shaped conductors can be received in a respective slot. It is preferable if exactly four, six, eight or ten shaped conductors are received in a respective slot.

The object on which the invention is based is furthermore achieved by an electric machine for driving a vehicle, comprising a stator according to the invention and a rotor which is rotatably mounted inside the stator core.

The electric machine is preferably designed as a synchronous machine or asynchronous machine. The rotor is preferably permanently excited. The electric machine can be configured to form part of a drive train of the vehicle.

The object on which the invention is based is furthermore achieved by a vehicle comprising an electric machine according to the invention. The vehicle can be a battery-electric vehicle (BEV) or a hybrid vehicle.

In particular, a slot can preferably be lined by a single slot lining.

Figure 1:
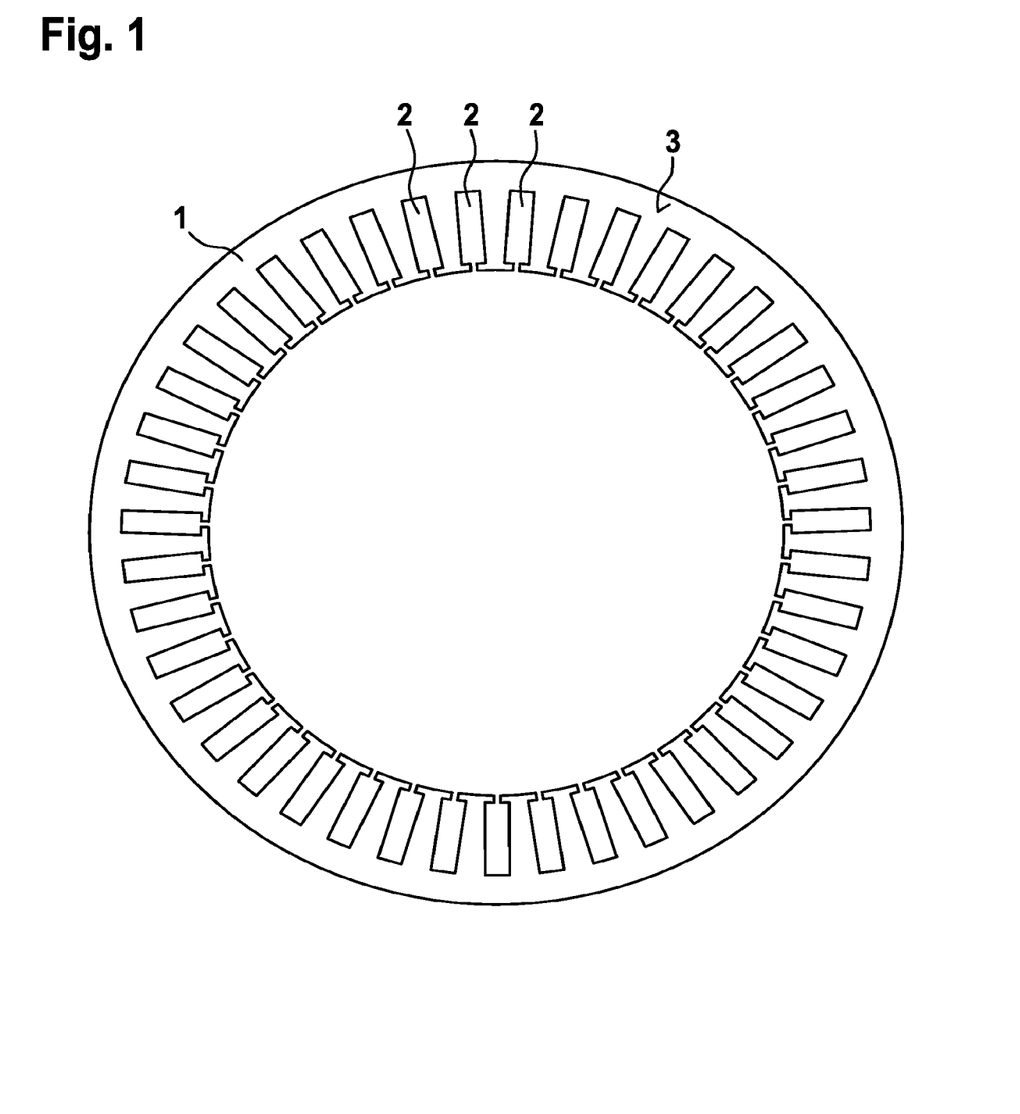
FIG. 1 shows a schematic diagram of an end view of a first exemplary embodiment of the stator core according to the invention.

Further advantages and details of the present invention can be derived from the exemplary embodiments described below and by means of the drawings. The latter are schematic illustrations in which:

FIG. 1 is a schematic diagram of a first exemplary embodiment of a stator core 1.

The stator core 1 has a multiplicity of slots 2 formed in the circumferential direction. The stator core 1 is shown in FIG. 1 with a view of a first end 3, from which the slots 2 extend in the axial direction to a second end, which is concealed in FIG. 1. By way of example, the stator core 1 is designed as a laminated stator core made up of a multiplicity of axially layered individual laminations which are electrically insulated in relation to one another.

Figure 2:
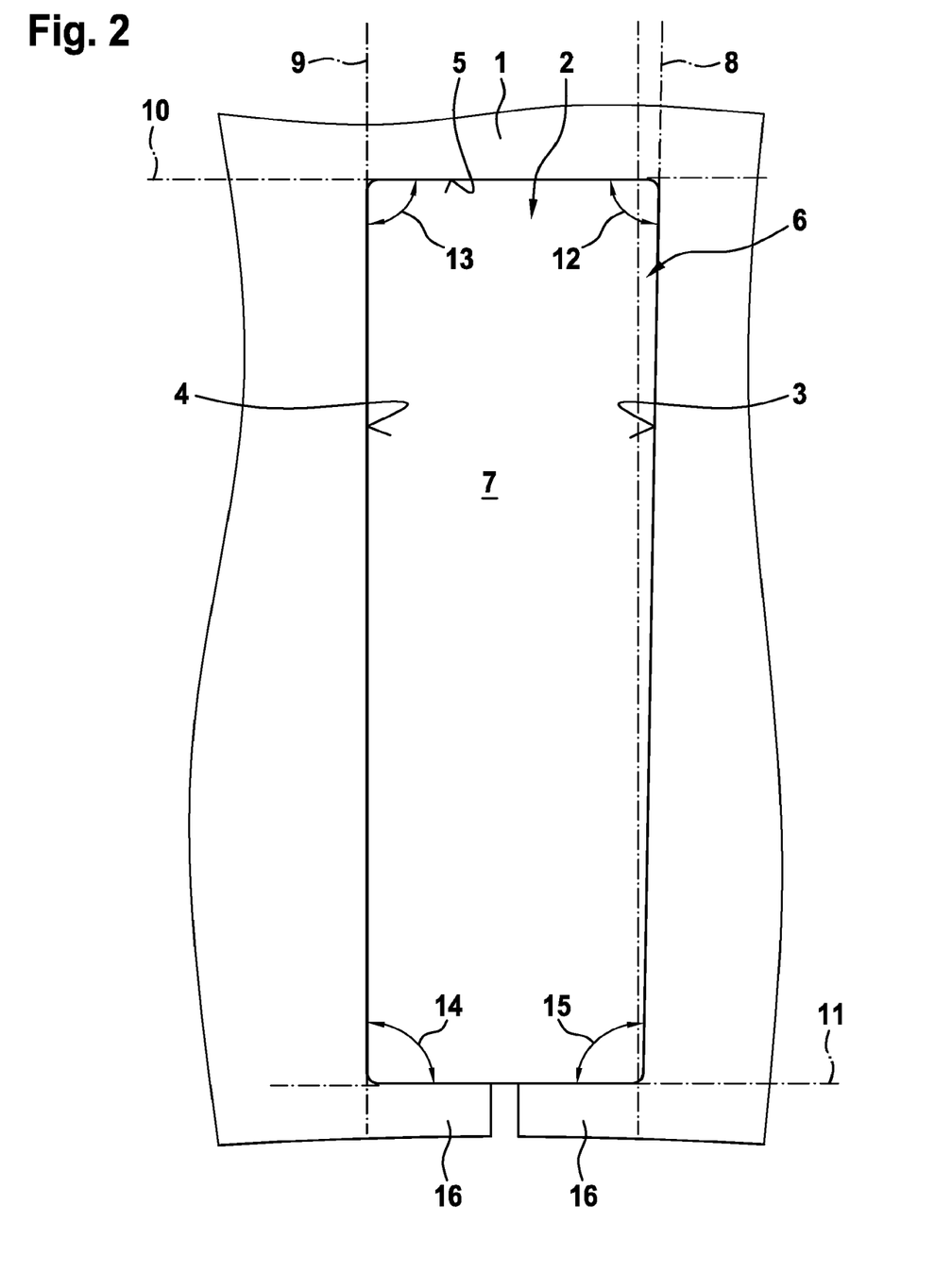
FIG. 2 shows a detail view of a slot of the stator core according to the first exemplary embodiment.

FIG. 2 is a detail view of one of the slots 2 in cross section, which is representative of the other slots 2 of the stator core 1.

The slot 2 has a first slot wall 3, a second slot wall 4, which is situated opposite the first slot wall 3 in the circumferential direction, and a slot base 5 connecting the slot walls 3, 4. The slot walls 3, 4 delimit the slot 2 in the circumferential direction. The slot base 5 delimits the slot 2 in the radial direction, here radially on the outside. The slot 2 also forms a first receiving space 6 and a second receiving space 7. The first receiving space 6 directly adjoins the second receiving space 7 in the circumferential direction and is delimited by the first slot wall 3 and by a section of the slot base 5. The second receiving space 7 is delimited by the second slot wall 4 and the slot base 5.

In the case of the stator core 1 according to the present exemplary embodiment, it is envisaged that the first slot wall 3 extends along a first straight line 8, the second slot wall 4 extends along a second straight line 9, and the slot base 5 extends along a third straight line 10. The first straight line 8 and the second straight line 9 form the legs of a trapezium, the first base side of which lies on the third straight line 10. A fourth straight line 11 extends at a radially innermost point of the slot 2, parallel to the third straight line 10, and forms a second base side of the trapezium. The fourth straight line 11 forms a boundary of the second receiving space 7.

The trapezium has a first interior angle 12 enclosed by the first straight line 8 and the third straight line 10, a second interior angle 13 enclosed by the second straight line and the third straight line 10, a third interior angle 14 enclosed by the second straight line 9 and the fourth straight line 11, and a fourth interior angle 15 enclosed by the first straight line 8 and the fourth straight line 11. The first interior angle 12 is smaller than the second interior angle 13. The second interior angle 13 and the third interior angle 13 are each 90°, and therefore the fourth interior angle 15 is 180° minus the first interior angle 12.

As a result, the first receiving space 6 is designed as a wedge-shaped widening of the slot 2 in the circumferential direction, while the second receiving space 7 is substantially rectangular (with the exception of the rounded configuration of the transitions between the slot walls 3, 4 and the slot base 5 and a transition of the slot walls 3, 4 and tooth heads 16 extending along the fourth straight line 11).

Figure 3:
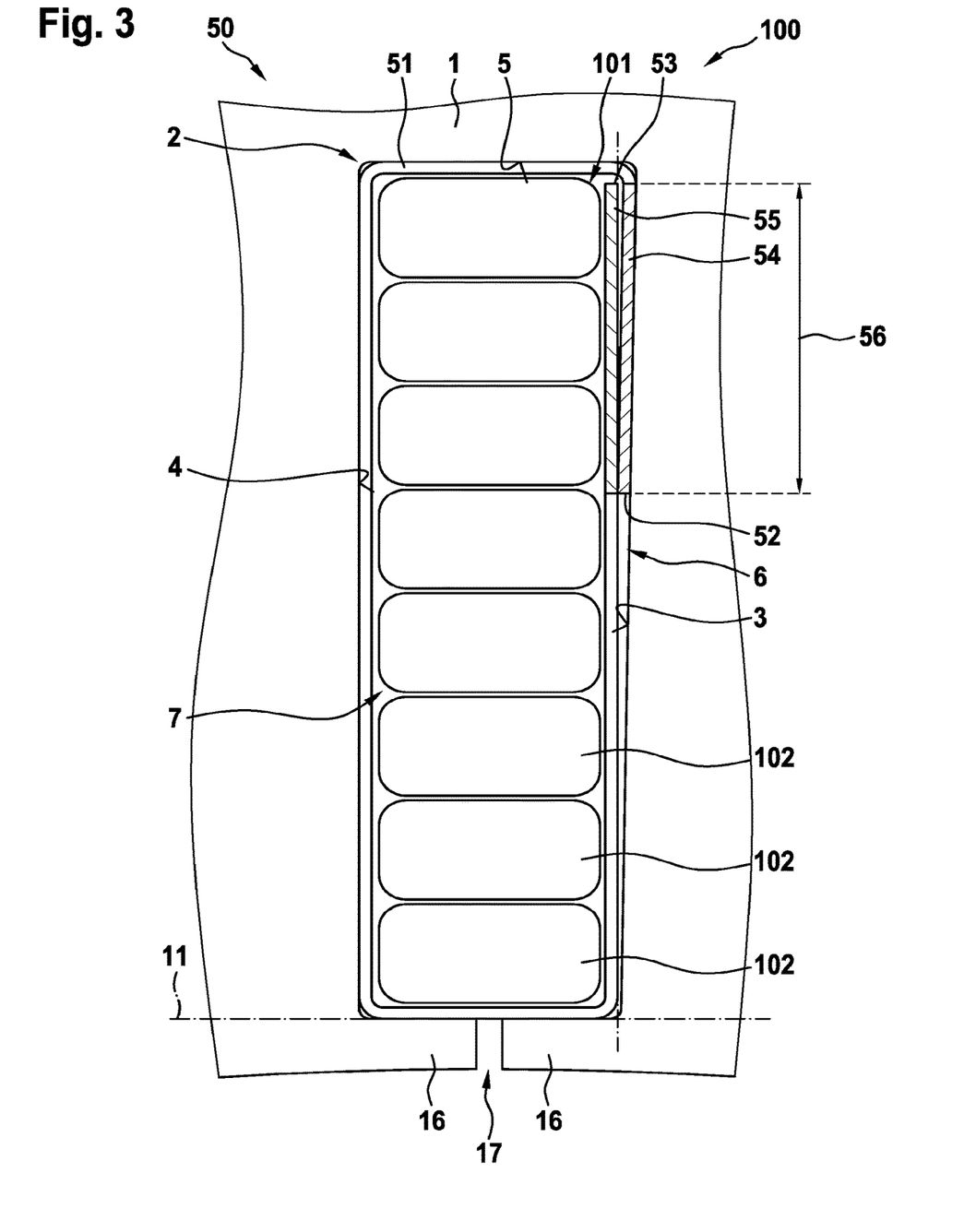
FIG. 3 shows a detail view of an exemplary embodiment of the stator according to the invention comprising an exemplary embodiment of the assembly according to the invention with the first exemplary embodiment of the stator core according to the invention and with slot linings.

FIG. 3 is a detail view of the slot 2 in an exemplary embodiment of a stator 100 which has a stator winding 101 and an assembly 50 comprising the first exemplary embodiment of the stator core 1 and a slot lining 51. FIG. 3 in turn shows one of the slot linings 51 as representative of the rest.

Arranged within a respective slot 2 of the stator core 1 is one of the slot linings 51, which extends axially completely through the slot 2. The slot lining 51 comprises a first end 52, which extends along the axial direction, and a second end 53, which extends along the axial direction. A hatched first end section 54 extends from the first end 52 in the direction of the second end. Extending from the second end 53 of the slot lining 51 in the direction of the first end 52 is a second end section 55, which is indicated by a different hatching and is overlapped by the first end section 54. As a result, an overlap 56 is formed, the length of which, when viewed in cross section, corresponds to that of the end sections 54, 55.

In this arrangement, the first end section 54 is received completely in the first receiving space 6. The second end section 55 and other sections of the slot lining 51 that do not belong to the first end section 54, on the other hand, are received in the second receiving space 7. The stator winding 101 is also received in the second receiving space 7.

As can be seen from FIG. 3, the first end section 54 or the overlap 56 is longer than the slot base 5 and the radially innermost distance between the slot walls 3, 4. As a result, a particularly long air and leakage path can be obtained along the overlap 56 for isolating the stator winding 101 from the stator core 1. It can also be seen from FIG. 3 that the overlapping end sections 54, 55 are situated radially closer to the slot base 5 than at the radially innermost point of the slot walls 3, 4 or of the slot lining 51.

The slot lining 51 is formed from an electrically insulating insulation paper. In this case, the slot lining 51 undergoes a bend from its first end 52 via the first end section 54 resting against the first slot wall 3 and, adjoining the first end section 54, runs along the slot base 5, against which the slot lining 51 rests. On the other side of the slot base 5, the slot lining 51 undergoes a further bend and runs along the second slot wall 4 and rests against the latter. When one of the tooth heads 16 is reached, the slot lining 51 undergoes a further bend and extends along the fourth straight line 11 along a slot opening 17 and the other tooth head 16 to the first slot wall 3. The slot lining 51 then runs along a boundary of the second receiving space 7 with the first receiving space 6 in the direction of the slot base 5 in such a way that the second end section 55 is overlapped by the first end section 54. In addition, the first end section 54 lies further out in the circumferential direction than the second end section 55.

FIG. 3 also shows a plurality of shaped conductors 102, here, by way of example, eight pieces, which form the stator winding 101. The shaped conductors 102 are formed from copper rods which extend completely along the axial direction and thus form a hairpin winding as a stator winding 101.

Figure 4:
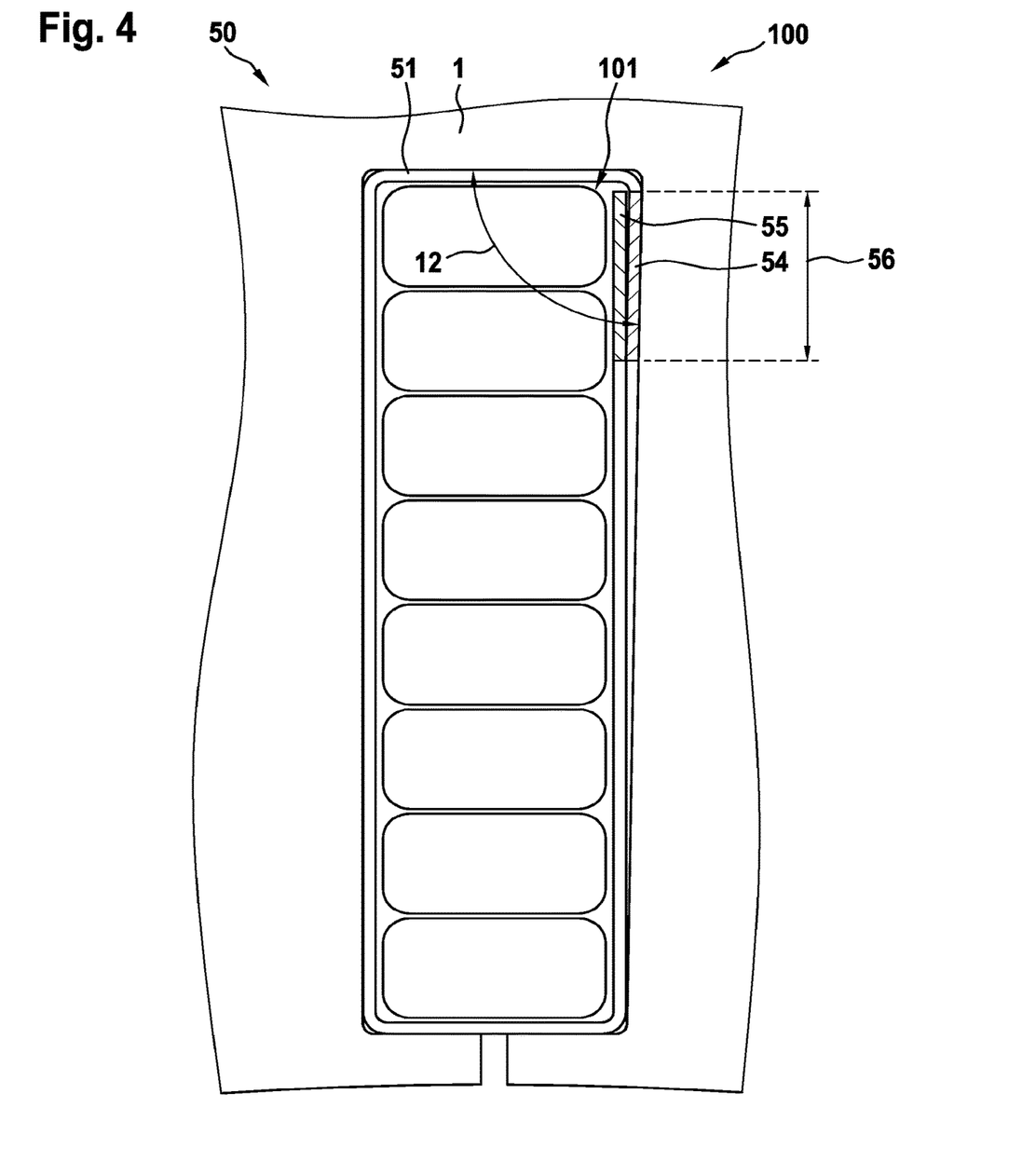
FIG. 4 shows a detail view of another exemplary embodiment of the stator according to the invention comprising an exemplary embodiment of the assembly according to the invention with a second exemplary embodiment of the stator core according to the invention and with slot linings.

FIG. 4 is a detail view of another exemplary embodiment of a stator 100, comprising an exemplary embodiment of an assembly 50 comprising a second exemplary embodiment of the stator core 1 and a slot lining 51 as well as a stator winding 101. Provided nothing to the contrary is described hereinafter, all previous statements can be applied to these exemplary embodiments.

In the second exemplary embodiment, the end sections 54, 55 and the overlap 56 are designed to be shorter than in the first exemplary embodiment. In FIG. 4, it can be seen that the first interior angle 12 is greater than in the first exemplary embodiment. From this, it can be deduced that, with increasing length of the end sections 54, 55 or of the overlap 56, a smaller interior angle 12 has to be provided.

Figure 5:
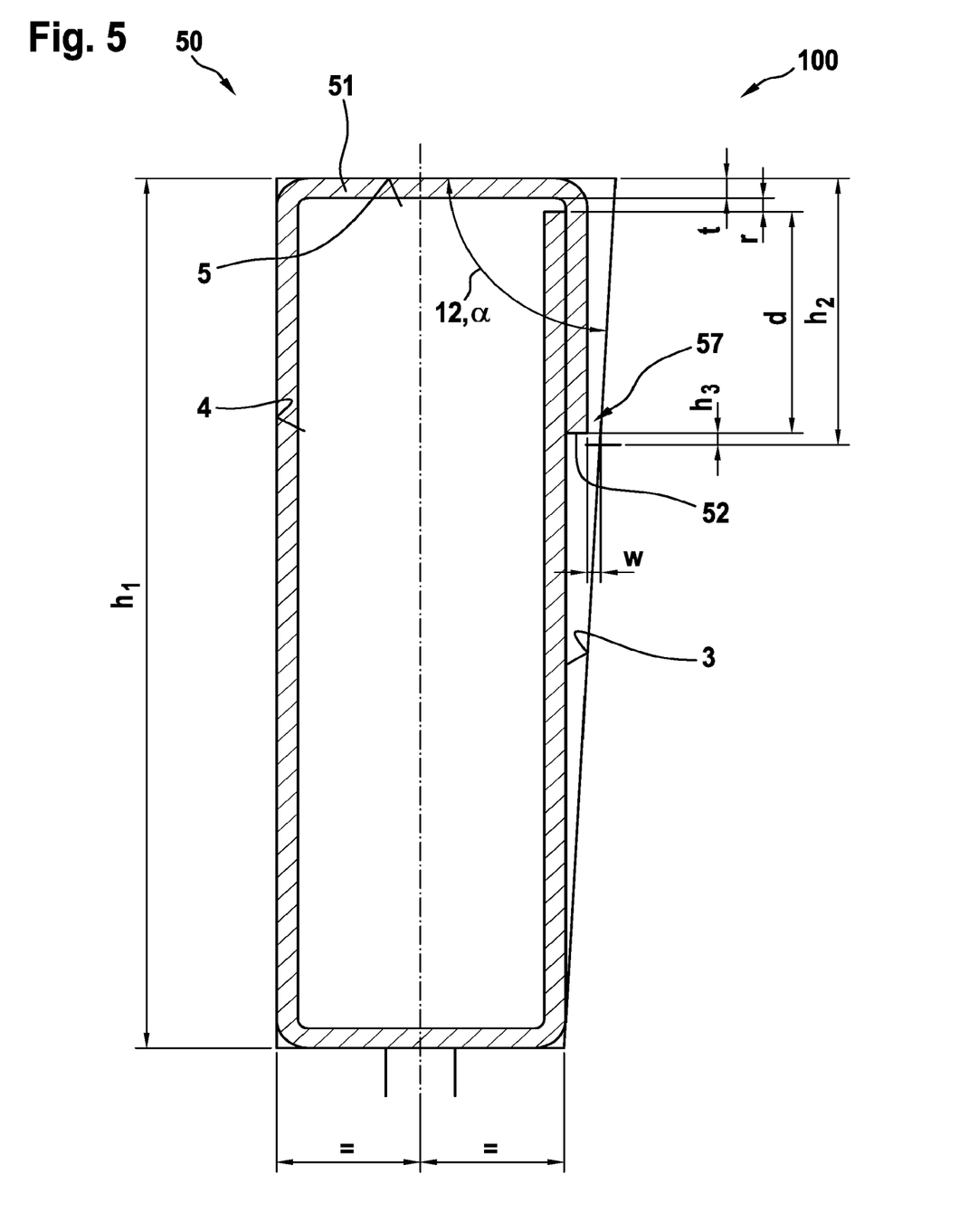
FIG. 5 shows a schematic diagram of a further exemplary embodiment of the stator according to the invention, comprising an exemplary embodiment of the assembly according to the invention with a third exemplary embodiment of the stator core according to the invention and with slot linings.

FIG. 5 is a schematic diagram of another exemplary embodiment of a stator 100, comprising another exemplary embodiment of an assembly 50 comprising a third exemplary embodiment of the stator core 1 and a slot lining 51. The stator winding 101 has not been illustrated for reasons of clarity. Provided nothing to the contrary is described hereinafter, the statements made in relation to FIG. 1 to FIG. 3 can be applied to these exemplary embodiments.

In the exemplary embodiments shown in FIG. 5, the first end section 54 and the second end section 55 run parallel. In addition, a tolerance distance 57 is provided between the first end 52 and the first slot wall 3.

The first interior angle 12 is determined as follows:

$$\tan(90° - \alpha) = \frac{t+w}{h_1 - h_2} = \frac{t+w}{h_1 - (t+r+d+h_3)}$$

$$\alpha = 90° - \arctan\left(\frac{t+w}{h_1 - (t+r+d+h_3)}\right)$$

Here, a denotes the first interior angle 12, t denotes a thickness of the slot lining 51, w denotes the tolerance distance 57, $h_1$ denotes a height of the second wall 4, $h_2$ denotes a distance between the slot base 5 and r denotes a bending radius of the slot lining 51, d denotes a length of the overlap 56 or a leakage path and $h_3$ denotes a tolerance height.

Figure 6:
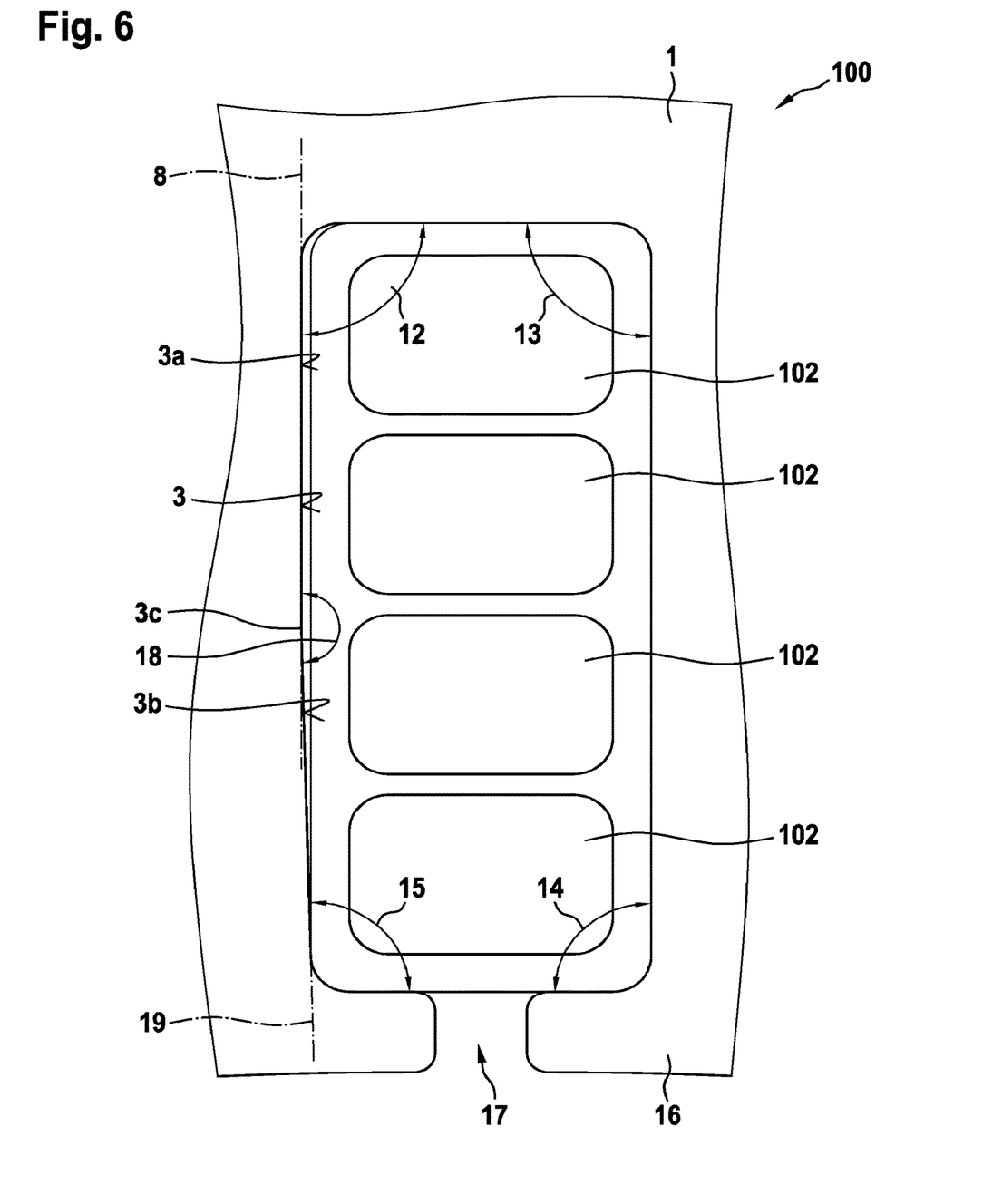
FIG. 6 shows a detail view of another exemplary embodiment of the stator according to the invention comprising an exemplary embodiment of the assembly according to the invention with a fourth exemplary embodiment of the stator core according to the invention and with slot linings.

FIG. 6 is a schematic diagram of another exemplary embodiment of a stator 100, comprising another exemplary embodiment of an assembly 50 comprising a fourth exemplary embodiment of the stator core 1 and a slot lining 51. The slot lining 51 has not been illustrated for reasons of clarity. Provided nothing to the contrary is described hereinafter, the statements made in relation to FIG. 1 to FIG. 3 can be applied to these exemplary embodiments.

In the exemplary embodiments shown in FIG. 6, the first slot wall 3 has a radially outer first section 3a and a radially inner second section 3b. The first section 3a extends along the first straight line 8. The second section 3b extends along a fifth straight line 19, which encloses a further interior angle 18 with the first straight line 8. The further interior angle 18 is less than 180° and in the present case has a value of approximately 177°. It follows from this, with a given first interior angle 12 and third and fourth interior angles 13, 14 of 90° in each case, that the fourth interior angle 15 is 360° minus the sum of the first and fifth interior angles 12, 18. In the present exemplary embodiment, the first interior angle 12 is 90° by way of example.

Figure 7:
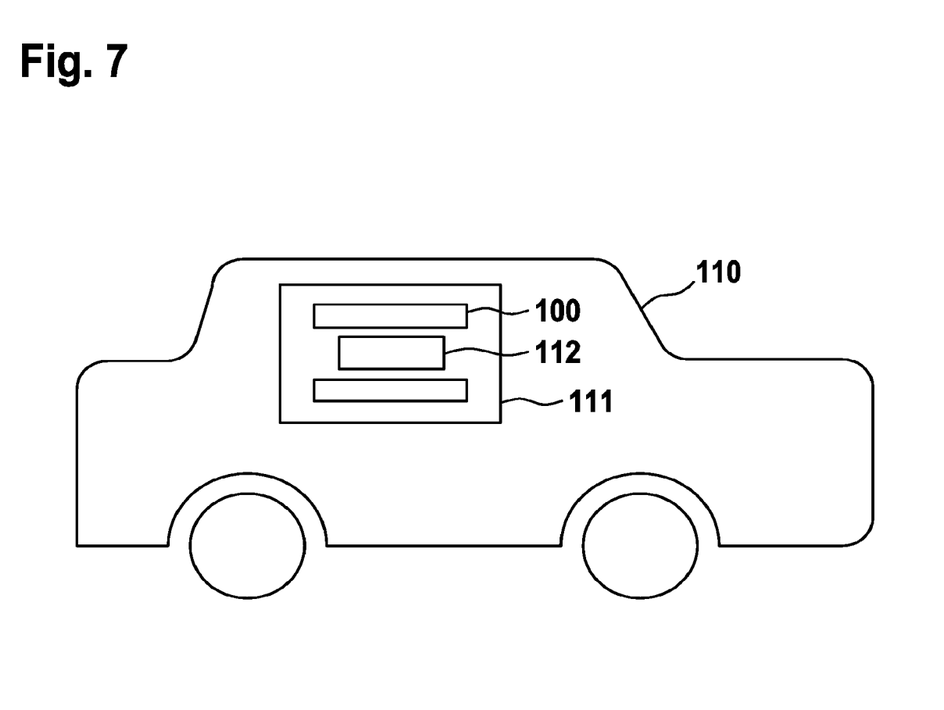
FIG. 7 shows a schematic diagram of an exemplary embodiment of the vehicle according to the invention having an exemplary embodiment of the electrical machine according to the invention.

In the exemplary embodiment shown in FIG. 6, the following dimensions can be provided in an illustrative specific embodiment:
  Width of a respective shaped conductor 102: 3 mm
  Height of a respective shaped conductor 102: 2 mm
  Curve radius of a rounding of a
    respective shaped conductor 102: 0.5 mm
  distance of the shaped conductors 102 from the
    second slot wall 4: 0.42 mm
  Radial distance of the radially innermost
    shaped conductor 102 from a radially innermost
    point of the slot lining 51 0.4455 mm
  Width of the slot opening 17 1 mm
  Height of the slot 2 9.6 mm
  Smallest distance between the slot walls 3, 4 3.85 mm
  Greatest distance between the slot walls 3, 4 4.07 mm
  Length of the first section 3a 4.0 mm
  Height of a tooth head 16 1.0 mm
  Curve radius at the ends of the
    slot walls 3, 4 0.5 mm
  Curve radius of the tooth heads 16 0.25 mm FIG. 7 shows a schematic diagram of an exemplary embodiment of a vehicle 110 comprising an electric machine 111 configured to drive the vehicle 110.

The electric machine 111 comprises a stator 100 according to one of the previously described exemplary embodiments and a rotor 112 arranged inside the stator 100.

The electric machine 111 is designed as a synchronous machine, in particular permanently excited, or as an asynchronous machine and is part of a drive train of the vehicle 110. This can also be regarded as a battery-electric vehicle (BEV) or as a hybrid vehicle.

The invention claimed is:

1. Stator core for receiving a stator winding and slot linings, wherein a respective slot lining has
    a first end, which extends along an axial direction,
    a second end, which is situated opposite the first end and extends along the axial direction,
    a first end section, which extends from the first end in the direction of the second end, and
    a second end section, which extends from the second end in the direction of the first end and is overlapped by the first end section on an outer side of the respective slot lining,
  wherein a multiplicity of slots arranged in the circumferential direction is formed in the stator core, wherein a respective slot has
    a first slot wall, which delimits the slot in the circumferential direction,
    a second slot wall, which is situated opposite the first slot wall and delimits the slot in the circumferential direction, and
    a slot base, which delimits the slot in the radial direction and forms
    a first receiving space, which is configured to receive the first end section, and
    a second receiving space, which directly adjoins the first receiving space, is delimited by the second slot wall and the slot base and is configured to receive the stator winding and the sections of the slot lining which are outside the first end section,
  wherein
    the first receiving space adjoins the second receiving space in the circumferential direction and is delimited by the first slot wall.

2. Stator core according to claim 1, wherein
the first slot wall extends along a first straight line at least in some section or sections, the second slot wall extends along a second straight line, and the slot base extends along a third straight line, so that the first straight line and the second straight line form the legs of a trapezium, the base side of which lies on the third straight line, wherein the trapezium has a first interior angle, which is enclosed by the first straight line and the third straight line, and a second interior angle, which is enclosed by the second straight line and the third straight line.

3. Stator core according to claim 2, wherein
the first slot wall extends in a straight line between a transition of the first slot wall into the slot base and a transition of the first slot wall into a radially inner boundary of the second receiving space.

4. Stator core according to claim 3, wherein
the first interior angle is smaller than the second interior angle or is a rectangle.

5. Stator core according to claim 3, wherein
the second interior angle is a rectangle.

6. Stator core according to claim 2, wherein
the first slot wall has a first section, which extends along the first straight line, and a second section, which extends along a further straight line, wherein, at a predetermined radial position, the first straight line and the further straight line enclose a further interior angle, which is less than 180 degrees, preferably less than 179 degrees, particularly preferably less than 178 degrees.

7. Stator core according to claim 2, wherein
the first interior angle is smaller than the second interior angle or is a rectangle.

8. Stator core according to claim 2, wherein
the second interior angle is a rectangle.

9. Stator core according to claim 1, wherein
the first end section is longer in cross section than the slot base and/or than a radially innermost distance between the slot walls.

10. Stator core according to claim 1, wherein
the end sections are arranged radially closer to the slot base than to the radially innermost point of the slot walls and/or than to the radially innermost point of the slot lining.

11. Stator core according to claim 2, wherein
the first end section is longer in cross section than the slot base and/or than a radially innermost distance between the slot walls.

12. Stator core according to claim 2, wherein
the end sections are arranged radially closer to the slot base than to the radially innermost point of the slot walls and/or than to the radially innermost point of the slot lining.

13. Assembly comprising a stator core according to claim 2 and the slot linings, wherein the first end section of the slot linings is received in the first receiving space of the slots and those sections of the slot linings which are outside the first end section are received in the second receiving space of the slots.

14. Assembly comprising a stator core according to claim 1 and the slot linings, wherein the first end section of the slot linings is received in the first receiving space of the slots and those sections of the slot linings which are outside the first end section are received in the second receiving space of the slots.

15. The assembly as claimed in claim 14, wherein
the first end section rests against the first slot wall and/or sections of the slot lining which are situated between the first end section and the second end section rest against the second slot wall and/or against the slot base.

16. Assembly according to claim 14, wherein
a respective slot lining is formed from an electrically insulating material, in particular from an insulation paper.

17. Stator comprising
an assembly according to claim 14 and the stator winding, a section or sections of which extend within the second receiving space of a respective slot and which is surrounded by the slot lining received in the respective slot.

18. The stator as claimed in claim 17, wherein
the stator winding is formed by shaped conductors, which are received in a radially layered manner in a respective slot.

19. Electric machine for driving a vehicle, comprising
a stator according to claim 17 and a rotor rotatably mounted inside the stator core.

20. Vehicle, comprising an electric machine according to claim 14.

* * * * *